(12) United States Patent
Nakano

(10) Patent No.: US 9,012,078 B2
(45) Date of Patent: Apr. 21, 2015

(54) METHOD FOR PRODUCING BATTERY ELECTRODE

(75) Inventor: Takahiko Nakano, Seto (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 403 days.

(21) Appl. No.: 13/508,778

(22) PCT Filed: Nov. 18, 2009

(86) PCT No.: PCT/JP2009/069539
§ 371 (c)(1), (2), (4) Date: May 9, 2012

(87) PCT Pub. No.: WO2011/061818
PCT Pub. Date: May 26, 2011

(65) Prior Publication Data
US 2012/0237825 A1    Sep. 20, 2012

(51) Int. Cl.
*H01M 4/13* (2010.01)
*H01M 4/82* (2006.01)
*H01M 4/04* (2006.01)
*H01M 4/131* (2010.01)
*H01M 4/137* (2010.01)
(Continued)

(52) U.S. Cl.
CPC .......... *H01M 4/0404* (2013.01); *H01M 4/0438* (2013.01); *H01M 4/131* (2013.01);
(Continued)

(58) Field of Classification Search
CPC .......................... H01M 4/0404; H01M 4/0409
USPC ........................... 429/217; 29/623.5; 118/620
See application file for complete search history.

(56) References Cited

U.S. PATENT DOCUMENTS 5,698,341 A * 12/1997 Tamaki et al. ............. 429/231.8
6,727,019 B2 * 4/2004 Travas-Sejdic et al. ...... 429/217

FOREIGN PATENT DOCUMENTS

JP    2002-110169    4/2002
JP    2002-313323    10/2002
(Continued)

OTHER PUBLICATIONS

International Search Report in International Application No. PCT/JP2009/069539; Mailing Date: Feb. 23, 2010.

*Primary Examiner* — Ula C Ruddock
*Assistant Examiner* — Thomas H Parsons
(74) *Attorney, Agent, or Firm* — Finnegan, Henderson, Farabow, Garrett & Dunner, LLP

(57) ABSTRACT

The present invention provides a method for producing a battery electrode having a configuration in which an active material layer containing an active material 22 and a polymer material 24 is retained on a current collector 10, the method comprising a step of applying a paste for forming an active material layer 28 containing the active material 22 and the polymer material 24 in a solvent 26, to the current collector 10, and a step of forming an active material layer on the current collector 10 by drying the applied paste 28. An ionic polymer exhibiting cationic or anionic properties in the paste 28 is used as at least one kind of the polymer material 24, and an electric potential having an opposite polarity to that of the ionic polymer 24 is applied to the current collector 10 after the paste 28 has been applied to the current collector 10.

12 Claims, 6 Drawing Sheets

(51) Int. Cl.
  *H01M 4/1399*  (2010.01)
  *H01M 4/60*    (2006.01)
  *H01M 4/62*    (2006.01)
  *H01M 4/66*    (2006.01)
  *H01M 10/052*  (2010.01)

(52) U.S. Cl.
  CPC ............ *H01M 4/137* (2013.01); *H01M 4/1399* (2013.01); *H01M 4/60* (2013.01); *H01M 4/602* (2013.01); *H01M 4/622* (2013.01); *H01M 4/661* (2013.01); *H01M 10/052* (2013.01); *Y02E 60/122* (2013.01); *Y02T 10/7011* (2013.01)

(56) References Cited

FOREIGN PATENT DOCUMENTS

| JP | 2003-157834 | | 5/2003 |
|----|-------------|---|--------|
| JP | 2006-54096  | | 2/2006 |
| JP | 2007-188871 | | 7/2007 |
| JP | 2007-193987 | | 8/2007 |
| JP | 2007193987  | * | 8/2007 |
| JP | 2008-171575 | | 7/2008 |
| JP | 2008-204829 | | 9/2008 |

* cited by examiner

METHOD FOR PRODUCING BATTERY ELECTRODE

CROSS-REFERENCE TO RELATED APPLICATIONS

This application is a national phase application of International Application No. PCT/JP2009/069539, filed Nov. 18, 2009, the contents of which are incorporated herein by reference.

TECHNICAL FIELD

The present invention relates to a method for producing a battery electrode, and more particularly to a method for producing a battery electrode having a configuration in which an electrode active material layer containing an electrode active material is retained on a current collector.

BACKGROUND ART

Lithium ion batteries, nickel-metal hydride batteries, and other secondary batteries have become more important recently as vehicle-mounted electrical power sources, and as power sources for personal computers and portable devices. In particular, it is expected that lithium secondary batteries that are light weight and provide high energy density can be preferably used as a high-output electric power source for vehicles. One typical configuration of this type of secondary battery comprises electrodes whereon a material (electrode active material) capable of reversibly absorbing and desorbing lithium ions is retained on a conductive material (current collector). Representative examples of an electrode active material that can be used for the negative electrode (negative electrode active material) include carbon materials such as graphite and amorphous carbon. Moreover, a representative example of a current collector that can be used for the negative electrode (negative current collector) is a sheet or foil component made of copper or primarily a copper alloy.

One representative method for retaining the negative electrode active material on the negative current collector when producing a negative electrode having such a configuration involves first preparing a paste for forming the active material layer by dispersing a negative electrode active material powder and a binder in a suitable solvent, next applying the paste to a negative current collector (copper foil, etc.) to form a layer containing the negative electrode active material (negative electrode active material layer) thereon, and then drying by passing the same through a hot air dryer, etc. The binder contained in the negative electrode active material layer fulfills the role of binding together the negative electrode active material itself, as well as adhering the negative electrode active material to the current collector. Patent documents 1 to 5 can be noted as technical documents relating to this kind of binder, etc.

CITATION LIST

Patent Literature

Patent Document 1: Japanese Patent Application Laid-open No. 2008-171575
Patent Document 2: Japanese Patent Application Laid-open No. 2002-110169
Patent Document 3: Japanese Patent Application Laid-open No. 2007-188871
Patent Document 4: Japanese Patent Application Laid-open No. 2008-204829
Patent Document 5: Japanese Patent Application Laid-open No. 2002-313323

As shown in FIG. 7, however, during the production of the above negative electrode, when the paste for forming the active material layer 228 containing the negative electrode active material 222 and the binder 224 is applied to the current collector 210 and dried by applying a hot air flow, convection occurs within the paste, and the binder 224 near the current collector 210 rises to the surface region of the paste. During drying, the surface region of the paste begins to dry first, and therefore the viscosity of the surface region becomes greater than that of the lower region (near the current collector). Consequently, the binder 224 that migrates from the lower region (near the current collector) to the surface region becomes immobilized (segregated) in the high viscosity surface region. As a result, the amount of binder near the current collector 210 is reduced, and the adhesion of the active material layer 220 to the current collector 210 decreases. This kind of loss of adhesion can cause a significant drop in battery performance. With the foregoing in view, a primary object of the present invention is to provide a method for producing a battery electrode that can reduce segregation of the above binder, and improve adhesion of the active material layer to the current collector.

SUMMARY OF INVENTION

The present invention provides a method for producing a battery electrode having a configuration in which an active material layer containing an active material and a polymer material is retained on a current collector. This method comprises a step of applying a paste for forming an active material layer containing an active material and a polymer material in a solvent, to the current collector, and a step of forming an active material layer on the current collector by drying the applied paste. In this case, the method is characterized in that an ionic polymer exhibiting cationic or anionic properties in the above paste is used as at least one kind of the above polymer material, and an electric potential having an opposite polarity to that of the ionic polymer is applied to the current collector after the paste has been applied to the current collector.

The method for producing an electrode of the present invention enables the manufacture of an electrode with superb adhesion between the active material layer and the current collector because the ionic polymer in the paste gathers near the current collector as a result of electrical attraction (electrostatic attraction). For example, in one preferred mode disclosed herein the above ionic polymer functions as the binder in the active material layer.

In this case, the amount of binder near the current collector increases because the binder in the paste gathers near the current collector as a result of electrical attraction (electrostatic attraction). Moreover, the binder will be drawn toward the current collector by electrical attraction even if convection occurs during drying of the paste, and thus it becomes more difficult for the binder near the current collector to rise to the surface region of the paste. Accordingly, a suitable amount of binder is maintained near the current collector, and the adhesion between the active material layer that is obtained after drying and the current collector can be increased thereby.

In one preferred mode disclosed herein the above polymer material includes a first polymer that functions as a binder in the above active material layer and a second polymer that functions as a thickener in the above paste, and the above ionic polymer is used at least as the second polymer. In this case, the viscosity of the paste near the current collector increases because the thickener (second polymer) in the paste gathers near the current collector as a result of electrical attraction. As a result, the mobility of the binder (first polymer) near the current collector decreases, and therefore it becomes more difficult for the binder near the current collector to rise to the surface region of the paste even if convection occurs during drying of the paste. Accordingly, a suitable amount of binder is maintained near the current collector, and the adhesion between the active material layer that is obtained after drying and the current collector can be increased thereby.

In one preferred mode disclosed herein the above ionic polymer can be an anionic polymer having an anionic functional group. Examples of an anionic functional group include a carboxyl group, sulfonate group, etc. The above anionic polymer can have only one type of these anionic functional groups or it can have a suitable combination and ratio of two or more anionic functional groups. In one preferred mode an anionic polymer having at least a carboxyl group is used as the above ionic polymer.

In one preferred mode disclosed herein the above ionic polymer can be an cationic polymer having a cationic functional group. Examples of a cationic functional group include an amino group, etc. The above cationic polymer can have only one type of these cationic functional groups or it can have a suitable combination and ratio of two or more cationic functional groups. In one preferred mode a cationic polymer having at least an amino group is used as the above ionic polymer.

In one preferred mode disclosed herein the solvent in the above paste is evaporated at a rate of 1 mL/s or higher per square meter of liquid surface area (i.e., 1 mL/s·m$^2$ or higher). With the present invention, the solvent in the paste can be evaporated off rapidly since there is no need to account for migration-induced binder maldistribution when setting the drying rate of the paste, and therefore productivity increases dramatically.

Moreover, the present invention provides an electrode manufacturing device that can preferably carry out the method for producing the above battery electrode. In other words, the present invention provides a manufacturing device for a battery electrode having a configuration in which an active material layer containing an active material and a polymer material is retained on a current collector. This device comprises: application means for applying, to the current collector, a paste for forming an active material layer containing an active material and a polymer material in a solvent; drying means for drying the paste that has been applied to the current collector; transport means for transporting the current collector through the application means and drying means; and electric potential application means for applying an electric potential to the current collector.

In one preferred mode disclosed herein an ionic polymer exhibiting cationic or anionic properties in the above paste is used as at least one kind of the above polymer material, and the electric potential application means is configured such that it can apply to the current collector an electric potential having an opposite polarity to that of the ionic polymer. When the electrode manufacturing device of the present invention is used, an electrode with superb adhesion between the active material layer and the current collector can be produced because the ionic polymer in the paste gathers near the current collector as a result of electrical attraction.

In one preferred mode disclosed herein the above electric potential application means is a charge roller to which a voltage has been applied. An electric potential can be efficiently applied to the current collector by using a charge roller.

In one preferred mode disclosed herein the above current collector is a continuous sheet-shaped current collector. Moreover, the electric potential application means is a roller conveyor that conveys the sheet-shaped current collector in a lengthwise direction thereof. With this configuration, a roller conveyor can be used as the electric potential application means, so the structure of the device can be simplified.

In one preferred mode disclosed herein the electric potential application means is positioned downstream of the paste application means and upstream of the drying means in the transport direction of the current collector. With this configuration, an electric potential can be reliably applied to the current collector before the paste completely dries.

The present invention further provides a battery (e.g., a lithium secondary battery) constructed using an electrode obtained by any of the methods disclosed herein. This battery is constructed using the electrode with superb adhesion of the active material layer to the current collector as described above for at least one of the electrodes and therefore exhibits excellent battery performance. For example, a battery featuring at least one characteristic from among excellent output characteristics, high durability, and good productivity can be provided by constructing the battery using the above electrode.

This kind of battery is suitable as a battery to be mounted in a vehicle such as an automobile, for example. Therefore, the present invention provides a vehicle equipped with any of the batteries disclosed herein (which can be in the form of a battery pack wherein a plurality of batteries are connected). More specifically, preferably the above battery is a lithium secondary battery (typically, a lithium ion battery) because light weight and high-output can be obtained thereby, and the vehicle (e.g., an automobile) is equipped with this lithium secondary battery as a power source (typically, a power source for a hybrid vehicle or an electric vehicle).

DESCRIPTION OF EMBODIMENTS

Figure 1:
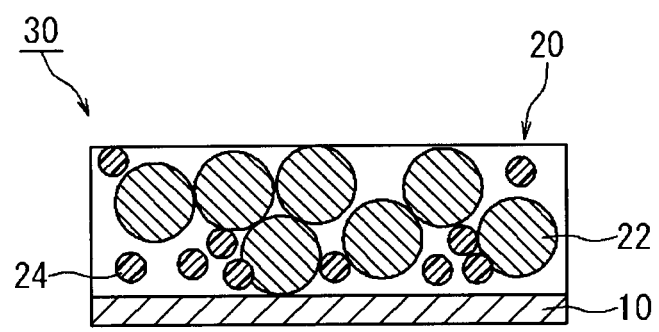
FIG. 1 is a cross-sectional drawing schematically illustrating the electrode in one embodiment of the present invention.

Embodiments of the present invention are described below with reference to the drawings. In the following drawings, all members and sites providing the same effect are indicated by the same symbols. It should also be noted that the dimensional relationships (length, width, height, etc.) in the drawings do not depict actual dimensional relationships. Moreover, matters necessary for carrying out the present invention other than those specifically referred to in the description (e.g., the construction and manufacturing methods for an electrode assembly featuring a positive electrode and a negative electrode; the construction and manufacturing methods for a separator and an electrolyte; common technology related to batteries and battery configurations) are understood to be matters of design for a person skilled in the art based on the prior art in this field.

Embodiment 1

Figure 2A:
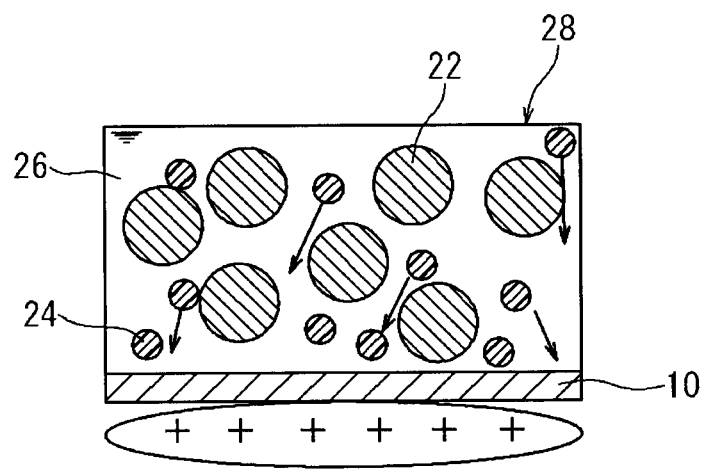
FIG. 2A is cross-sectional drawing schematically illustrating a step in the process for producing the electrode in one embodiment of the present invention.
Figure 2B:
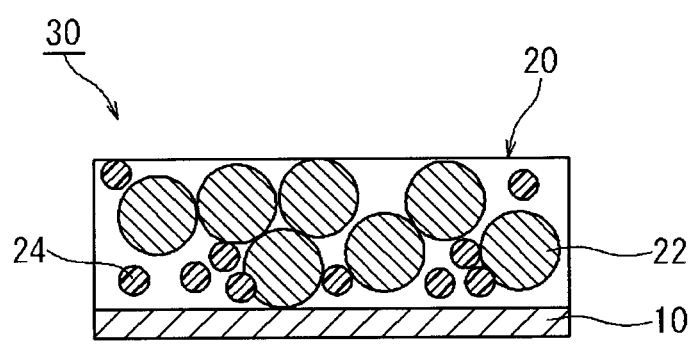
FIG. 2B is cross-sectional drawing schematically illustrating a step in the process for producing the electrode in one embodiment of the present invention.

The method for producing a battery electrode disclosed herein is a method for producing an electrode 30 having a configuration in which an active material layer 20 containing an active material 22 and a polymer material 24 is retained on a current collector 10, as shown in FIG. 1. This method comprises a step wherein a paste for forming an active material layer 28 containing the active material 22 and the polymer material 24 in a solvent 26 is applied to the current collector 10, as shown in FIG. 2A, and a step wherein the active material layer 20 is formed on the current collector 10 by drying the applied paste 28, as shown in FIG. 2B.

Here an ionic polymer 24 exhibiting cationic or anionic properties in the above paste is used as at least one kind of the above polymer material, and an electric potential having an opposite polarity to that of the ionic polymer 24 is applied to the current collector 10 after the paste has been applied thereto. The ionic polymer in this embodiment is an anionic polymer having a carboxyl group, and for example, carboxylated styrene-butadiene rubber (XSBR) can be used. An $H^+$ ion dissociates from the carboxyl group (—COOH) in the paste solvent, and the group becomes negatively charged. A positive electric potential opposite to that of the anionic polymer 24 is then applied to the current collector 10 after the above paste has been applied thereto.

In the method for producing an electrode in the present embodiment, an electrode 30 with superb adhesion of the active material layer 20 to the current collector 10 can be produced because the ionic polymer 24 in the paste 28 gathers near the current collector 10 as a result of electrical attraction (electrostatic attraction). The above anionic polymer (XSBR, etc.) functions as a binder, for example, in the active material layer 20. In this case, the amount of binder near the current collector 10 increases because the binder 24 in the paste 28 gathers near the current collector 10 as a result of electrical attraction (electrostatic attraction). Moreover, the binder 24 will be drawn toward the current collector by electrical attraction even if convection occurs during drying of the paste, and therefore it becomes more difficult for the binder 24 near the current collector to rise to the surface region of the paste. Accordingly, a suitable amount of binder is maintained near the current collector 10, and the adhesion between the active material layer 20 that is obtained after drying and the current collector 10 can be increased thereby.

The production of a negative electrode for use primarily in a lithium secondary battery (typically, a lithium ion battery) is described in detail below as an example, but this description is by no means intended to limit the present invention thereto.

A metal with good conductivity (e.g., a metal such as aluminum, nickel, copper, or stainless steel, or an alloy consisting primarily of these metals) can be preferably used as the negative current collector 10. For example, the use of a current collector made from copper (copper or an alloy consisting primarily of copper (i.e., a copper alloy)) is preferred when producing a negative electrode for a lithium secondary battery.

The method for applying an electric potential to the current collector is not particularly limited herein and, for example, a contact charging system that brings a charging component to which a voltage has been applied into contact with the current collector can be used. In the technology disclosed herein, for example, a method that brings a charge roller to which a voltage has been applied into contact with the surface of the current collector and rotating the roller can be preferably used as the method for applying an electric potential to the current collector. An electric potential can be efficiently applied to the current collector by bringing this kind of charge roller into contact with the surface of the current collector and rotating the roller. The strength of the electric potential to be applied to the current collector will differ depending upon the selection of the polymer, the formulation of the other paste constituents, the drying conditions, etc., but usually about 0.1 V to 3 V is suitable and, for example, about 0.5 V to 1 V is preferable.

The paste for forming an active material layer 28 can be prepared by mixing a negative electrode active material (typically in the form of a powder) 22 with a binder (an ionic polymer) 24 in a suitable solvent 26.

One example of a suitable solvent to be used for the above paste is an aqueous medium. Water or a mixed solvent consisting mainly of water can be preferably used as the aqueous medium. As a solvent component other than water that constitutes this mixed solvent, one or more types of organic solvents (lower alcohols, lower ketones, etc.) capable of mixing homogenously with water can be suitably selected and used. For example, preferably an aqueous solvent comprising 50 mass % or more water (more preferably 80 mass % or more water, even more preferably 90 mass % or more water) is used. An aqueous solvent substantially comprising water can be noted as a particularly preferred example. An aqueous medium can be preferably used as a solvent suited to the object of the present invention because polymer functional groups ionize well therein. It should be noted that the solvent is not limited to an aqueous solvent and can also be a non-aqueous solvent (the organic solvent serving as the main dispersive medium for the active material). For example, N-methyl pyrrolidone (NMP), etc., can be used as a nonaqueous solvent.

The negative electrode active material is not particularly limited here provided it is the same as one typically used in a lithium-ion secondary battery. Examples of the negative electrode active material 22 that is used in the negative electrode include carbon materials such as graphite and amorphous carbon, lithium transition metal composite oxides (lithium titanium composite oxides, etc.), and lithium transition metal composite nitrides, etc.

Preferably an anionic polymer having an anionic functional group is used as the above binder (ionic polymer). Examples of anionic functional groups include a carboxyl group, a sulfonate group, etc. The above anionic polymer can have only one type of these anionic functional groups or it can have two or more anionic functional groups in a suitable combination and ratio. In one preferred mode an anionic polymer having at least a carboxyl group is used as the above ionic polymer. For example, a water-dispersible anionic polymer can be preferably used as the above binder when an active material layer is formed using an aqueous paste (a paste wherein water or a mixed solvent consisting primarily of water is used as the dispersive medium for the active material). Examples of a water dispersible anionic polymer include types of carboxylated styrene-butadiene rubber (XSBR), acrylic acid modified SBR resin (SBR latex), etc. Alternatively, an anionic polymer that is dispersible in a solvent-based paste (a paste wherein the dispersive medium for the active material is primarily an organic solvent) can be used when the active material layer is formed using such a solvent-based paste. It should also be noted that in addition to its function as a binder, the polymer listed can also function as a thickener or another additive for the above paste.

The number of ionic functional groups contained per unit weight of ionic polymer is not particularly limited herein and, for example, it can suitably be about $0.5 \times 10^{-3}$ mol/g to $2 \times 10^{-3}$ mol/g, and about $1 \times 10^{-3}$ mol/g to $1.5 \times 10^{-3}$ mol/g is normally preferred.

Although not particularly limited herein, preferably the solid content ratio of the paste for forming the negative electrode active material layer is about 30% or higher (typically, 30% to 90%), and about 40% to 60% is preferred. Moreover, preferably the ratio of negative electrode active material in the solid content of the paste is about 50 mass % or higher (typically, 50 mass % to 99.5 mass %), and preferably about 70 mass % to 99 mass %. Furthermore, the ratio of polymer in the solid content of the paste can be, for example, 10 mass % or lower, and about 0.5 mass % to 6 mass % (e.g., 4 mass % to 6 mass %) is preferred.

The paste for forming the negative electrode active material layer can be applied to the negative current collector 10 can in a manner similar to that used to fabricate negative electrodes for use in existing conventional lithium secondary batteries. For example, a layer with a uniform thickness can be formed by applying a given amount of the above paste for forming an active material layer 28 to the current collector 10 using a suitable application device (die coater, etc.).

The paste for forming a negative electrode active material layer can be dried in a manner similar to that used to fabricate negative electrodes for use in existing conventional lithium secondary batteries. For example, the paste for forming a negative electrode active material layer 28 can be dried by applying a flow of hot air of a given temperature thereto using a suitable dryer. Although not particularly limited herein, the temperature of this hot air flow can be about 70° C. to 160° C., and generally when an aqueous solvent is used (i.e., the dispersive medium for the active material is primarily an aqueous solvent), the range is preferably about 80° C. to 120° C. Moreover, with the technology disclosed herein, preferably the solvent in the above paste is evaporated at a rate of roughly more than 1 mL/s·m² (e.g., 1 mL/s·m² to 3 mL/s·m²). With the present invention, the solvent in the paste can be evaporated off rapidly since there is no need to account for migration-induced binder maldistribution setting the drying rate of the paste, and therefore productivity increases dramatically.

After drying the paste for forming the negative electrode active material layer, the thickness and density of the negative electrode active material layer 20 can be adjusted by using a suitable pressing process as needed (e.g., all prior art, well known pressing methods such as roll pressing and plate pressing can be used).

Figure 3:
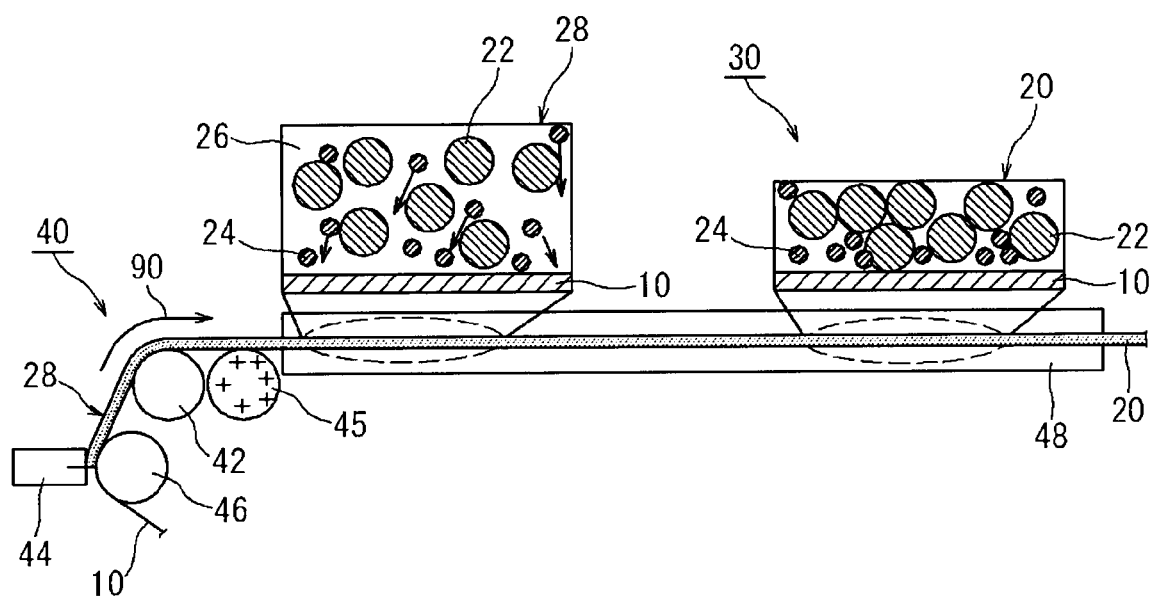
FIG. 3 is a drawing schematically illustrating the electrode manufacturing device in one embodiment of the present invention.

The electrode manufacturing device 40 that can carry out the method for producing the above battery electrode will be described next with the addition of FIG. 3. This manufacturing device 40 for an electrode 30 having a configuration in which an active material layer 20 containing an active material 22 and an ionic polymer (binder) 24 is retained on top on a current collector 10 comprises application means 44, drying means 48, transport means 42 and 46, and electric potential application means 45.

The application means 44 is a die coater in this example and is configured such that it can apply the paste for forming an active material layer 28 containing an active material 22 and an ionic polymer 24 in a solvent to the current collector 10. The drying means 48 is a hot air dryer in this example that is positioned downstream of the application means 44 in the transport direction 90 of the current collector, and that is configured such that it can dry the paste 28 that has been applied to the current collector. The transport means 42, 46 is configured such that it can convey the current collector 10 through the application means 44 and the drying means 48. In this example, the current collector 10 is a continuous sheet-shaped current collector and the transport means 42, 46 comprise roller conveyors that convey the above current collector sheet in the lengthwise direction.

The electric potential application means 45 is configured such that it can apply an electric potential to the current collector 10. In this embodiment an anionic polymer is used as the ionic polymer (binder) 24 and the electric potential application means 45 is configured such that it can apply a positive electric potential, which is the opposite polarity to that of the above anionic polymer, to the current collector. In this embodiment the electric potential application means 45 is a charge roller. The charge roller 45 is made from a metal material having good conductivity and is positioned downstream of the die coater 44 and upstream of the dryer 48 in the current collector transport direction 90. Moreover, a voltage source (not illustrated) is connected to the charge roller 45 and a voltage is applied thereto with this voltage source.

Next the operation of the above device 40 will be described. First, the continuous sheet-shaped current collector 10 passes through the space between the roller conveyor 46 and the die coater 44, and the paste for forming an active material layer 28 is applied thereto as the current collector 10 is conveyed by the rotation of the roller conveyors 42, 46. Then current collector 10 is charged with a positive electric potential by bringing the charge roller 45 to which a voltage has been applied into contact with the surface of the current collector and rotating the same. The anionic polymer (binder) 24 in the paste gathers near the current collector 10 as a result of the electrical attraction produced by this charging. Thereafter the active material layer 20 is formed on the current collector by drying the paste 28 with the hot air dryer 48.

When the electrode manufacturing device 40 of the present invention is used, an electrode 30 with superb adhesion between the active material layer 20 and the current collector 10 can be produced because the anionic polymer (binder) 24 in the paste gathers near the current collector 10 as a result of electrical attraction. Moreover, an electric potential can be efficiently applied to the current collector 10 by using the charge roller 45 as the electric potential application means. Moreover, the charge roller 45 can reliably apply an electric potential to the current collector before the paste completely dries because it is positioned downstream of the die coater 44 and upstream of the dryer 48 in the current collector transport direction 90.

Embodiment 2

In the above embodiment a case is described wherein the ionic polymer functions as a binder in the active material layer, but the present invention is not limited thereto. For example, the ionic polymer can function as a thickener in the paste instead of or in addition to its function as a binder.

Figure 4A:
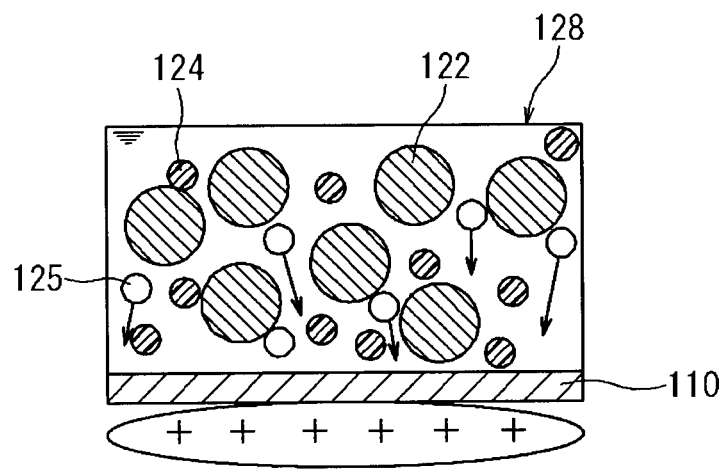
FIG. 4A is cross-sectional drawing schematically illustrating a step in the process for producing the electrode in one embodiment of the present invention.
Figure 4B:
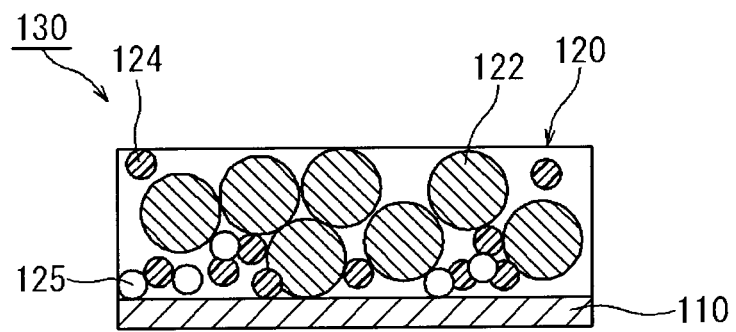
FIG. 4B is cross-sectional drawing schematically illustrating a step in the process for producing the electrode in one embodiment of the present invention.

In other words, as shown in FIG. 4A, in this embodiment the polymer material comprises a first polymer 124 that functions as a binder in the active material layer 120 and a second polymer 125 that functions as a thickener in the paste, and an ionic polymer is used at least as the second polymer (thickener) 125. An electric potential opposite to that of the second polymer (thickener) 125 is then applied to the current collector 110 after the paste has been applied thereto.

The second polymer (thickener) 125 in this embodiment is an anionic polymer having a carboxyl group and, for example, carboxymethyl cellulose (CMC) can be used therefor. Moreover, the first polymer (binder) 124 is a nonionic polymer material and, for example, styrene-butadiene rubber (SBR) can be used therefor. A positive electric potential having a polarity opposite to that of the anionic polymer 125 is then applied to the current collector 110 after the above paste has been applied thereto.

In accordance with the method of the present embodiment, the viscosity of the paste 128 near the current collector 110 increases because the thickener (second polymer) 125 in the paste gathers near the current collector as a result of electrical attraction. This decreases the mobility of the binder (first polymer) 124 near the current collector, and therefore it becomes more difficult for the binder 125 near the current collector to rise to the surface region of the paste even if convection occurs during drying of the paste. Accordingly, a suitable amount of binder is maintained near the current collector 110, and the adhesion between the active material layer 120 that is obtained after drying and the current collector can be increased.

Preferably an anionic polymer having an anionic functional group can be used as the above thickener (second polymer). For example, a water-soluble anionic polymer can be preferably used as the above thickener when an active material layer is formed using an aqueous paste (a paste in which water or a mixed solvent consisting primarily of water is used as the dispersive medium for the active material). An example of a water-soluble anionic polymer is carboxymethyl cellulose (CMC), etc. Alternatively, an anionic polymer that is soluble in a solvent-based paste (a paste in which the dispersive medium for the active material is primarily an organic solvent) can be used when the active material layer is formed using such a solvent-based paste. It should also be noted that the above polymer can function as a binder in addition to its function as a thickener in the paste.

One or more types of polymers that can be combined in the negative electrode active material layer of a typical lithium secondary battery can be preferably used as the above binder (first polymer). Examples include fluorinated resins such as polytetrafluoroethylene (PTFE), tetrafluoroethylene-perfluoro alkyl vinyl ether copolymer (PFA), tetrafluoroethylene-hexafluoropropylene copolymer (FEP), and ethylene-tetrafluoroethylene copolymer (ETFE); and rubbers such as vinyl acetate copolymers, styrene butadiene rubber (SBR), and gum arabic. It should also be noted that the anionic polymers listed in Embodiment 1 can be used as the binder (first polymer) 124. The configurations of Embodiments 1 and 2 can each be used alone or they can be appropriately combined and used together.

A more detailed description is presented below based upon Examples 1 and 2.

Example 1

In this example, a paste for forming an active material layer 28 was prepared by dispersing graphite powder as the negative electrode active material 122 and carboxylated styrene-butadiene rubber (XSBR) as the ionic polymer (binder) in water such that the mass ratio of these ingredients was 99:1. This paste for forming an active material layer 28 was applied to one side of a continuous sheet-shaped copper foil (current collector 22) such that the thickness thereof was 100 µm, and the negative electrode sheet 30 with a negative electrode active material layer 20 formed on a current collector 10 was obtained by applying a positive charge of approximately 2.4 V to the current collector using a charge roller and then drying with a hot air flow at approximately 120° C. for 20 seconds. It should also be noted that the solid content ratio of the paste for forming the active material layer was adjusted to approximately 50%. Moreover, XSBR having carboxyl groups on the order of roughly $2\times10^{-3}$ mol/g was used.

Meanwhile, a negative electrode sheet wherein no electric potential was applied to the current collector was fabricated as Comparative Example 1. The negative electrode sheet was fabricated in the same manner as in Example 1 except no electric potential was applied to the current collector.

The adhesion of the negative electrode sheets obtained in Example 1 and Comparative Example 1 were evaluated with a 180-degree peel test using a tensile testing machine. An Aikoh Engineering small desktop load measuring instrument (model 1307) was used as the tensile testing machine. The peel strength in Example 1, wherein an electric potential was applied to the current collector, was 2.5 kgf but the peel strength in Comparative Example 1, wherein no electric potential was applied to the current collector, was 1.5 kgf. From this result it was confirmed that applying an electric potential to the current collector increases the adhesion between the active material layer and the current collector by gathering the binder in the paste near the current collector.

Example 2

In this example, a paste for forming an active material layer was prepared by dispersing natural graphite powder as the negative electrode active material, carboxymethyl cellulose (CMC) as the ionic polymer (thickener), and styrene-butadiene rubber (SBR) as the binder in water such that the mass ratio of these ingredients was 98:1:1. This paste for forming an active material layer was applied to one side of a continuous sheet-shaped copper foil (current collector) such that the thickness thereof was 100 µm, and a negative electrode sheet with a negative electrode active material layer formed on the current collector was obtained by applying a positive charge of approximately 2.4 V to the current collector using a charge roller and then drying with a hot air flow at approximately 120° C. for 20 seconds. It should also be noted that the solid content ratio of the paste for forming the active material layer was adjusted to approximately 50%. Moreover, CMC having carboxyl groups on the order of roughly $2\times10^{-3}$ mol/g was used.

Meanwhile, a negative electrode sheet wherein no electric potential was applied to the current collector was fabricated as Comparative Example 2. The negative electrode sheet was fabricated in the same manner as in Example 2 except no electric potential was applied to the current collector.

The binder (SBR) contained in the negative electrode active material layers obtained in Example 2 and Comparative Example 2 was dyed with bromine and the amount of binder contained in the respective negative electrode active material layers was measured by observing the cross-sectional distribution of bromine using an electron probe microanalyzer (EPMA). The maldistribution of binder (amount of binder in the upper layer/amount of binder in the lower layer) in the vertical direction (thickness direction) was evaluated when the negative electrode active material layer was divided in the center into two layers. Here the ratio of the amount of binder in the upper layer and lower layer was obtained by detecting the ratio of bromine intensity with the EPMA. The degree of binder maldistribution in Comparative Example 2, wherein no electric potential was applied to the current collector, was approximately 2.4 and more than 70% of the binder was segregated in the upper layer, but the degree of binder maldistribution in Example 2, wherein an electric potential was applied to the current collector, was approximately 1.3, and segregation of the binder was greatly reduced in comparison with Comparative Example 2. These findings confirmed that the segregation of binder in the upper layer can be reduced by applying an electric potential to the current collector and gathering the thickener in the paste near the current collector.

It should also be noted that the binder maldistribution in the negative electrode active material layer of the negative electrode sheet in Example 2 was approximately 1.3, but the maldistribution of binder can be freely adjusted with the technology disclosed herein depending upon the selection of the polymer, the formulation of the other paste constituents, the strength of the applied electric potential, the drying conditions, etc. For example, the binder maldistribution can be adjusted to less than 1 (i.e., the amount of binder in the lower layer is greater than the amount of binder in the upper layer). The lower limit of binder maldistribution is not particularly limited herein. In general, a value of about 1 with no imbalance in the binder is suitable.

Preferably the electrode (e.g., negative electrode) obtained in this way can be used as a component for various kinds of batteries or as a component (e.g., a negative electrode) for the electrode assembly contained in such batteries because, as noted above, the adhesion between the active material layer and current collector is superb. For example, a negative electrode produced with any of the methods disclosed herein can be preferably used as a component for a lithium secondary battery featuring a positive electrode (which can be a positive electrode produced by applying the present invention), an electrolyte provided between the positive and negative electrodes, and a separator that is typically interposed between the positive and negative electrodes (which can be omitted in a battery using a solid or gel electrolyte). The construction and size of the outer container for this battery (e.g., a metal casing or a laminate film structure) as well as the construction of the electrode assembly (e.g., a wound construction or a laminate construction) comprising primarily the positive and negative current collectors are not particularly limited herein.

Figure 5:
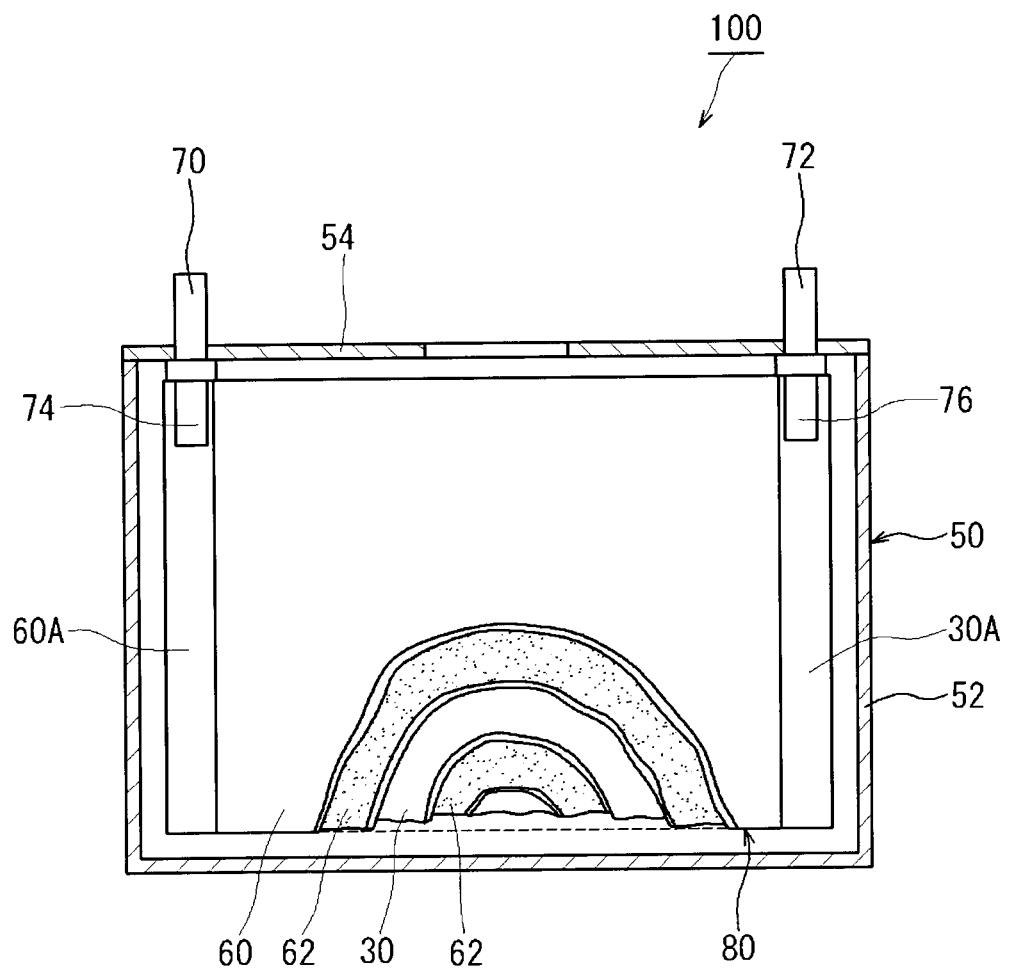
FIG. 5 is a drawing schematically illustrating the battery in one embodiment of the present invention.

An embodiment of a lithium secondary battery constructed using a negative electrode (negative electrode sheet) 30 produced by applying the above method is described below with references to the schematic drawing shown in FIG. 5.

As shown in the drawing, the lithium secondary battery 100 in the present embodiment is housed in a case 50 which is made from metal (a case of resin or laminate film is also suitable). This case (outer container) 50 features a flat prismatic case body 52 that is open at the top and a lid 54 for sealing the opening. On the upper surface of the case 50 (i.e., the lid 54), a positive terminal 70 electrically connected to the positive electrode 60 of the wound electrode assembly 80 and a negative terminal 72 electrically connected to the negative electrode 30 thereof are provided. A continuous sheet-shaped positive electrode (positive electrode sheet) 60, for example, and a continuous sheet-shaped negative electrode (negative electrode sheet) 30 interposed by two continuous sheet-shaped separators (separator sheets) 62 are laminated together and wound, and then the flattened wound electrode assembly 80 fabricated by compressing the resulting wound assembly in the lateral direction is housed inside the case 50.

As described above, the negative electrode sheet 30 has a configuration in which a negative electrode active material layer 20 consisting primarily of a negative electrode active material 22 is provided on both sides of a continuous sheet-shaped negative current collector 10 (see FIG. 1). Moreover, the positive electrode sheet 60 has a configuration in which a positive electrode active material layer consisting primarily of a positive electrode active material is provided on both sides of the continuous sheet-shaped positive current collector in a manner similar to the negative electrode sheet. On the edges of these electrode sheets 30 and 60 in the widthwise direction an area is provided on both surfaces whereon an electrode active material layer is not formed.

In the laminated case as described above, positive electrode sheet 60 and negative electrode sheet 30 are overlain with a slight offset in the widthwise direction such that the area whereon a positive electrode active material layer is not formed on the positive electrode sheet 60 and the area whereon the negative electrode active material layer is not formed on the negative electrode sheet 30 protrude in the widthwise direction from both sides of the separator sheets 62. As a result, the respective edges of the positive electrode sheet 60 and the negative electrode sheet 30 whereon an electrode active material layer is not formed protrude from the wound core component (i.e., the component wound tightly with the positive electrode active material layered portion of the positive electrode sheet 60, the negative electrode active material layered portion of the negative electrode sheet 30, and the two separator sheets 62) in the horizontal direction relative to the winding direction of wound electrode assembly 80. A positive terminal lead 74 and a negative terminal lead 76 are added to the protruding positive electrode component (i.e., the area whereon a layer of the positive electrode mixture has not been formed) 60A and the protruding negative electrode component (i.e., the area whereon a layer of the negative electrode mixture has not been formed) 30A, respectively, and then they are electrically connected to the positive terminal 70 and negative terminal 72, respectively.

It should also be noted that the components of the positive electrode sheet 100 in the wound electrode assembly 80 can be the same as those in the electrode assemblies of prior lithium secondary batteries but are not limited thereto. For example, the positive electrode sheet 60 can be formed by adding a positive electrode active material layer consisting primarily of a positive electrode active material for a lithium secondary battery to a continuous sheet-shaped positive current collector. An aluminum foil or another metal foil suited for a positive electrode can be suitably used for the positive current collector. One or more types of materials used previously in lithium secondary batteries can be used as the positive electrode active material without limitation. A most suitable example includes a lithium transition metal composite oxide (e.g., $LiMn_2O_4$, $LiCoO_2$, $LiNiO_2$, etc.) containing lithium and one or more transition metals as the constituent metal elements.

Moreover, a suitable example of the separator sheets 62 that are used between the positive and negative electrode sheets 60, 30 is a porous polyolefin resin sheet. It should also be noted that when a solid electrolyte or a gel electrolyte is used as the electrolyte, a separator is unnecessary (in other words, in such cases the electrolyte itself can function as the separator).

Next the wound electrode assembly 80 is placed into the case 50 from the top opening in the case body 52 and an electrolyte solution containing a suitable electrolyte is provided (injected) therein. A lithium salt such as $LiPF_6$ is an example of an electrolyte. For example, a nonaqueous electrolyte solution wherein an appropriate amount (e.g., a 1 M concentration) of a lithium salt such as $LiPF_6$ is dissolved in a mixed solvent consisting of diethyl carbonate and ethylene carbonate (e.g., in a mass ratio of 1:1) can be used as the electrolyte solution.

Thereafter the opening is sealed with a lid 54 by welding, etc., to complete the construction of the lithium secondary battery 100 in the present embodiment. The process for sealing the case 50 and the process for providing (injecting) the electrolyte can be carried out in a manner similar to those used in the production of prior lithium secondary batteries and do not characterize the present invention. The construction of the lithium secondary battery 100 in the present embodiment is completed in this manner.

The lithium secondary battery 100 thus configured is constructed using an electrode with good adhesion between the active material layer and current collector as described above for at least one of the electrodes, and therefore has superb battery performance. For example, a battery that has at least one characteristic from among excellent output characteristics, high durability, and good productivity can be provided by constructing a battery (e.g., a lithium ion battery) using the above electrode.

Figure 6:
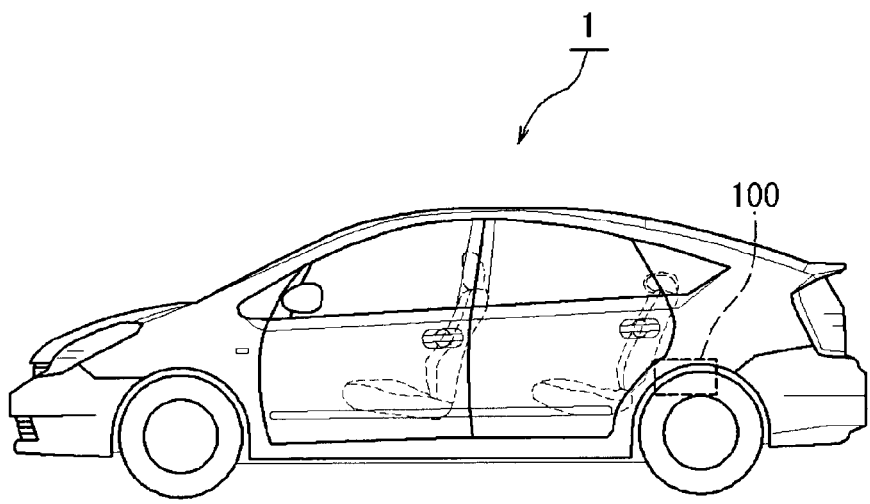
FIG. 6 is a side view schematically illustrating a vehicle equipped with the battery in one embodiment of the present invention.
Figure 7:
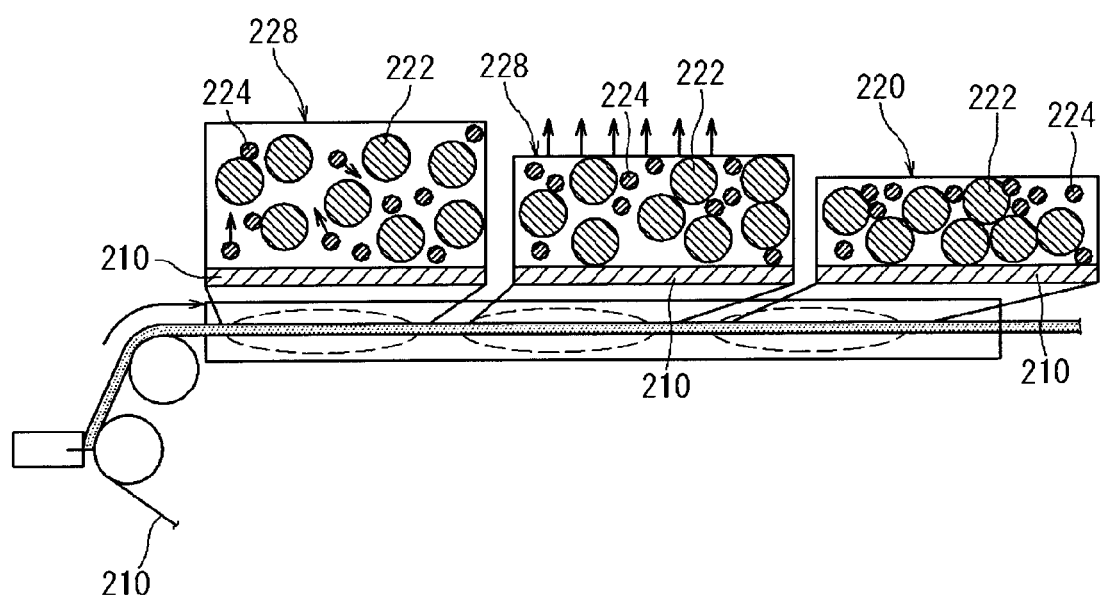
FIG. 7 is a drawing schematically illustrating the conventional steps for producing an electrode and the electrode manufacturing device.

The battery (e.g., a lithium secondary battery) in the present invention can preferably be used as the electric power source for motors (electric motors) to be mounted in vehicles such as automobiles in particular because it has excellent battery performance as described above. Therefore, the present invention provides a vehicle 1 (typically an automobile, and in particular an automobile equipped with an electric motor of the sort found in hybrid automobiles, electric automobiles, and fuel-cell automobiles) that is equipped with the lithium secondary battery 100 (which may be a battery pack) as the electric power source as illustrated schematically in FIG. 6.

The present invention was described with preferred embodiments above, but such a description is not a limiting condition, and of course a variety of modifications thereof are possible.

For example, the ionic polymer is an anionic polymer having an anionic functional group in the embodiment above, but it is not limited thereto. An ionic polymer exhibiting cationic properties in the paste can also be used. In this case, a negative electric potential opposite to that of the cationic polymer can be applied to the current collector after the paste has been applied thereto. An example of a cationic functional group is an amino group, etc. The above cationic polymer can have only one type of these cationic functional groups, or it can have two or more cationic functional groups in an appropriate combination and ratio. In one preferred mode a cationic polymer having at least an amino group is used as the above ionic polymer.

Moreover, the subject matter disclosed in this description comprises a battery electrode having a configuration in which an active material layer containing an active material and a polymer is retained on a current collector, and it is characterized in that the amount of binder contained in a portion of the active material layer near the current collector (lower layer) is greater than the amount of binder contained in the portion opposite the current collector (upper layer) when the active material layer is divided from the center into two parts in the thickness direction (i.e., two layers of equal thickness). An electrode of this configuration, for example, can be suitably realized by applying any of the methods or the devices disclosed herein.

I claim:

1. A method for producing a battery electrode having a configuration in which an active material layer containing an active material and a polymer material is retained on a current collector, comprising:
    preparing a paste for forming an active material layer containing an active material and an ionic polymer in a solvent, the ionic polymer exhibiting cationic or anionic properties in the paste;
    applying the paste to the current collector;
    applying, to the current collector before drying the applied paste, an electric potential having a polarity opposite to that of the ionic polymer; and
    forming the active material layer on the current collector by drying the applied paste.

2. The method according to claim 1, wherein the ionic polymer functions as a binder in the active material layer.

3. The method according to claim 1, wherein the polymer material includes a first polymer that functions as a binder in the active material layer, and a second polymer that functions as a thickener in the paste, the ionic polymer being used at least as the second polymer.

4. The method according to claim 1, wherein an anionic polymer having at least a carboxyl group is used as the ionic polymer.

5. The method according to claim 1, wherein the solvent in the paste is evaporated at a rate of 1 $mL/s \cdot m^2$ or higher.

6. A battery comprising a battery electrode produced by the method according to claim 1.

7. A vehicle comprising the battery according to claim 6.

8. The method according to claim 1, wherein the strength of the electric potential to be applied to the current collector is 0.1 V to 3 V.

9. The method according to claim 1, wherein the number of ionic functional groups contained per unit weight of ionic polymer is $0.5 \times 10^{-3}$ mol/g to $2 \times 10^{-3}$ mol/g.

10. A manufacturing device for a battery electrode having a configuration in which an active material layer containing an active material and a polymer material is retained on a current collector, comprising:
    application means for applying, to the current collector, a paste for forming an active material layer containing an active material and a polymer material in a solvent;
    drying means for drying the paste that has been applied to the current collector;
    transport means for transporting the current collector through the application means and drying means; and
    electric potential application means for applying an electric potential to the current collector,
    wherein the electric potential application means is positioned downstream of the application means and upstream of the drying means in the transport direction of the current collector,
    wherein an ionic polymer exhibiting cationic or anionic properties in the paste is used as at least one kind of the polymer material, and the electric potential application means is configured to apply to the current collector an electric potential having an opposite polarity to that of the ionic polymer.

11. The manufacturing device according to claim 10, wherein the electric potential application means is a charge roller to which a voltage has been applied.

12. The manufacturing device according to claim 10, wherein the current collector is a continuous sheet-shaped current collector, and the electric potential application means is a roller conveyor that conveys the sheet-shaped current collector in a lengthwise direction thereof.

* * * * *